United States Patent
Pretorius et al.

(10) Patent No.: US 8,922,624 B2
(45) Date of Patent: Dec. 30, 2014

(54) OPTICAL OBSERVATION INSTRUMENT WITH AT LEAST TWO OPTICAL TRANSMISSION CHANNELS THAT RESPECTIVELY HAVE ONE PARTIAL RAY PATH

(75) Inventors: Marco Pretorius, Oberkochen (DE); Enrico Geissler, Jena (DE); Guenter Rudolph, Jena (DE); Christoph Nieten, Jena (DE); Bryce Anton Moffat, Jena-Cospeda (DE); Artur Hoegele, Oberkochen (DE)

(73) Assignee: Carl Zeiss Meditec AG, Jena (DE)

( * ) Notice: Subject to any disclaimer, the term of this patent is extended or adjusted under 35 U.S.C. 154(b) by 494 days.

(21) Appl. No.: 13/358,632

(22) Filed: Jan. 26, 2012

(65) Prior Publication Data

US 2012/0229605 A1 Sep. 13, 2012

(30) Foreign Application Priority Data

Jan. 27, 2011 (DE) .................. 10 2011 010 262

(51) Int. Cl.
*H04N 13/02* (2006.01)

(52) U.S. Cl.
USPC .............. 348/46; 348/E15.001; 348/E13.074

(58) Field of Classification Search
CPC .......... H04N 13/0239; H04N 13/0055; H04N 13/0296; H04N 13/0497; H04N 13/0242
See application file for complete search history.

(56) References Cited

U.S. PATENT DOCUMENTS

| | | | |
|---|---|---|---|
| 5,450,220 A | 9/1995 | Onishi et al. | |
| 5,828,487 A | 10/1998 | Greening et al. | |
| 5,835,264 A | 11/1998 | Tandler et al. | |
| 2003/0151810 A1 | 8/2003 | Haisch et al. | |
| 2004/0017607 A1* | 1/2004 | Hauger et al. | ............. 359/376 |
| 2004/0042078 A1 | 3/2004 | Osawa et al. | |
| 2007/0279733 A1 | 12/2007 | Sander | |
| 2007/0285770 A1 | 12/2007 | Sander | |
| 2010/0182681 A1 | 7/2010 | Luecke et al. | |
| 2010/0265555 A1 | 10/2010 | Keyworth et al. | |

FOREIGN PATENT DOCUMENTS

| | | |
|---|---|---|
| DE | 195 42 827 | 5/1997 |
| DE | 197 22 726 | 1/1998 |
| DE | 102 04 430 | 8/2003 |
| DE | 103 00 925 | 9/2003 |
| DE | 102 50 953 | 5/2004 |
| DE | 10 2005 004 681 | 8/2006 |
| DE | 10 2008 024 732 | 1/2010 |
| EP | 0 590 984 | 4/1994 |

OTHER PUBLICATIONS

J. Opt. A: Pure Appl. Opt. 8 (2006) S. 341-S. 346.

* cited by examiner

*Primary Examiner* — Dave Czekaj
*Assistant Examiner* — Nam Pham
(74) *Attorney, Agent, or Firm* — Gerald E. Hespos; Michael J. Porco; Matthew T. Hespos

(57) ABSTRACT

An optical observation instrument has two optical transmission channels for transmitting two partial ray bundles (9A, 9B). The optical observation instrument has a main objective (1) common to the optical transmission channels, an electronic image sensor (7) for sequentially recording the partial ray bundles (9A, 9B), an intermediate imaging optical system (3) between the main objective (1) and the image sensor (7) and common to the optical transmission channels, and a tilting mirror matrix (5) between the main objective (1) and the image sensor (7). The intermediate imaging optical system (3) is arranged so that the respective partial ray bundle (9A, 9B) is deflected toward the image sensor (7) and passes the intermediate imaging optical system (3) both on the way from the main objective (1) to the tilting mirror matrix (5) and on the way from the tilting mirror matrix (5) to the image sensor (7).

23 Claims, 5 Drawing Sheets

OPTICAL OBSERVATION INSTRUMENT WITH AT LEAST TWO OPTICAL TRANSMISSION CHANNELS THAT RESPECTIVELY HAVE ONE PARTIAL RAY PATH

BACKGROUND OF THE INVENTION

1. Field of the Invention

The present invention relates to an optical observation instrument with at least two optical transmission channels that respectively have one partial ray path and an electronic image recording system for recording, sequentially in time, the partial ray bundles transmitted by the optical transmission channels. An example of such an optical observation instrument is a stereoscopic optical observation instrument such as e.g. a stereo microscope, more particularly a surgical microscope. In such an instrument, the stereo channels are the optical transmission channels, each of which transmitting a stereoscopic partial ray path, i.e. the ray path for a stereoscopic partial image, to the electronic image sensor.

2. Description of the Related Art

The prior art has disclosed a number of arrangements for recording stereoscopic images, in which separate image receivers and, at least in part of the imaging ray path, separate imaging optical systems are provided for the two stereoscopic partial ray paths. By way of example, US 2004/0017607 A1 describes a stereo microscope, which has a beamsplitter common to both stereoscopic partial ray paths and a common main objective. Otherwise, the microscope has optical components and image sensors which are respectively only provided for the partial ray bundle of a stereoscopic partial ray path. Such arrangements have disadvantages as a result of the underlying principle, for example a large installation volume and relatively high costs for providing double the number of optical systems and image sensors.

In addition to the stereoscopic optical observation instruments with a common main objective, which are also referred to as telescope systems, there are also stereoscopic optical observation instruments in which, additionally, use is made of separated main objectives, and so the two stereo channels only have optical components that are completely separated from the components of the respectively other channel. Such systems are referred to as Greenough systems. In order to provide partial images that have been correctly adjusted stereoscopically at different object distances in Greenough systems, the divergence angle between the optical axes of the stereo channels must be adjusted. Moreover, the magnifications in the two stereoscopic partial ray paths must be exactly identical. In the case of a zoom system, this identity of the magnifications must be ensured over the entire zoom range, which places great demands on the production and adjustment. Like in the case of telescope systems with a common main objective and further optical components separated into stereo channels, Greenough-type systems have a large installation volume and high costs for providing double the number of optical components. Moreover, Greenough-type systems have complex mechanical designs.

Furthermore, the prior art has disclosed optical observation instruments, in which the stereoscopic partial ray paths are imaged on a common image receiver by a common main objective, the common image receiver recording the stereoscopic partial images alternately in time. To this end, a device is required that, during a first time interval T1, allows the light in a first partial ray path to pass to the image receiver and at the same time blocks the light in the second partial ray path and, during a subsequent second time interval T2, allows the light in the second partial ray path to pass to the image receiver and at the same time blocks the light in the first partial ray path. Here, the time intervals T1 and T2 correspond to the integration time at the image sensor and are typically of the order of a few milliseconds. The required frequency for switching the channel then typically is 50 to 100 Hz. In order to block the light in the partial ray paths, or to allow it to pass, use is typically made of stops (shutters) that can be switched synchronously with the camera. These stops alternately let light pass through one of two stop openings. By way of example, such a system is described in U.S. Pat. No. 5,828,487.

Shutters may be based on both mechanical and optical principles and are used in the vicinity of pupils in order to unblock partial pupils of a stereo basis alternately and thus allow the observer to see a plastic scene. In the case of mechanical shutters, the passage of light to the image receiver is mechanically blocked in one stereo channel for a predetermined time interval and simultaneously unblocked in the other stereo channel by means of a movable, usually rotating, device. The advantage of mechanical shutters lies in the fact that there are no light losses for the respectively opened stereo channel. However, it is disadvantageous that a mechanical shutter may cause vibrations and noise. This particularly holds true in the case of relatively high switching frequencies. Moreover, ensuring precise synchronicity between shutter and camera requires control with a feedback loop. Furthermore, the inertial mass of the shutter component means that the switching frequency cannot be modified abruptly. Moreover, if there is a desire to produce more than one stereo basis (this may for example be necessary if in addition to the treating medical practitioner as a main observer using the surgical microscope, there also is an assistant as co-observer, whose stereo basis differs from the stereo basis of the main observer by an angle not equal to 180°), two pairs of pupils must be served in succession by the shutter. That is to say, light may only pass through one of four pupils at any one time. Moreover, it is often desirable for the connecting line between the pupils of the one pupil pair to be able to include any angle with the connecting line between the pupils of the other pupil pair, more particularly angles between 10° and 90°, so that the two observers can undertake a surgical intervention in their respective optimum position with respect to the patient. So that the shutter function by means of rotating stops can allow an unambiguous separation of the stereo channels for all orientations of the pupil pairs with respect to one another, the shutter may only unblock a small angle segment <<90° for transmission, while the light from the entire remaining angular region must be blocked. As a result, only a fraction of the theoretically possible integration time per frame on the image sensor can be used, which in turn leads to a loss in image brightness. Thus, overall, rotating stops do not constitute a light-efficient solution for switching channels between a plurality of pupil pairs that are rotated with respect to one another.

In addition to the mechanical shutters, the prior art has disclosed electro-optical shutters. Liquid-crystal stops are an example of these; here the optical transmission of light with a predetermined polarization state can be switched with a high frequency and without movable mechanical components. If the liquid-crystal stop is designed such that portions can be switched to be transparent or non-transparent independently of one another, it is also simple, compared to a solution with mechanical shutters, to switch a plurality of pupil pairs, as is required in the case of more than one observer, without there being a reduction in the theoretically possible integration time per frame on the image sensor. The principle of the liquid-crystal stops is based on the fact that an electric control voltage, applied to a liquid-crystal layer, leads to a polar or chiral orientation of the liquid-crystal molecules and, resulting therefrom, a linear or circular birefringence. If such a liquid-crystal layer is situated in the ray path between a polarizer and an analyzer, oriented in the passage or block direction thereto, an increase in the control voltage brings about a reduction or an increase in the transmission through the entire device, and so the shutter effect can be controlled electronically. However, a disadvantage of liquid-crystal stops is that, as a result of the underlying principle, they are only able to transmit a fraction of the light flow over the stereo channel in the allow-passage setting. Since, as a result of the underlying principle, liquid-crystal shutters can only switch light of one polarization state but most applications use unpolarized light sources, there typically are light losses of at least 50%. However, the actual light losses generally are even greater since the liquid-crystal medium itself only has a restricted transmission of typically 70 to 80%.

In order to avoid high losses by polarization in liquid-crystal stops, there is the option of using liquid-crystal stops which are based on polymers, as disclosed in e.g. EP 0 590 984 A1. In these, liquid crystals are dispersed in a fixed polymer structure. An electric field is used to align the liquid crystals such that domains form between fixedly aligned polymers. This increases the light scattering, and so the stop becomes non-transparent. By changing the applied electric voltage, the stop may be switched between a transmitting and a scattering state. Although such liquid-crystal stops make it possible to avoid the loss of at least half the light, the transmission of such a component is also only 80% at best. Moreover, the light is scattered and not absorbed in the non-transparent state, and so parts of the stray light could reach the image receiver through the optical system. Thus, the use of liquid-crystal displays on polymer basis does not render possible a high-contrast separation of the stereo channels.

Compared to this prior art, the object of the present invention may be considered to be the provision of an advantageous optical observation system with at least two optical transmission channels such as e.g. two stereo channels.

SUMMARY OF THE INVENTION

An optical observation instrument according to the invention has a first optical transmission channel for transmitting a first partial ray bundle and at least a second optical transmission channel for transmitting a second partial ray bundle. Here, the optical transmission channels can in particular realize two stereo channels, which respectively transmit one stereoscopic partial ray bundle. The optical observation instrument according to the invention comprises a number of optical elements which are arranged along an optical axis. Here the optical axis need not necessarily have a strictly linear profile. Rather, a folded optical axis may be present, i.e. one in which the one part is at an angle compared to another part. Here, use can be made of at least one deflection element for deflecting the ray bundles passing through the optical elements.

The optical elements of the optical observation instrument according to the invention comprise a main objective common to the optical transmission channels, which main objective may more particularly have a collimating design, i.e. such that the ray bundles emanating from an object plane are substantially parallel after passing though the main objective, i.e. are substantially imaged at infinity. However, non-collimating objectives may also be used within the scope of the invention. The main objective can either be an objective with a fixed focal length or an objective with a variable focal length. By modifying the focal length, objectives with a variable focal length make it possible to record objects in object planes at different distances from the objective and at the same time keep a parallel ray path on the image side. Such objectives with a variable focal length are also referred to as varifocal-objectives or varioscopes.

Furthermore, the optical components of the optical observation instrument according to the invention comprise an electronic image recording system which at least consists of an image sensor for recording, sequentially in time, the partial ray bundles transmitted by the optical transmission channels. An intermediate imaging optical system common to the optical transmission channels is arranged between the main objective and the image sensor. Moreover, there is a tilting mirror matrix with a number of tiltable tilting mirror elements, which can be controlled in respect of their tilt position. Said tilting mirror matrix is arranged between the main objective and the electronic image sensor in or in the vicinity of an image plane of the intermediate imaging optical system. Here, the tilting mirror matrix can in particular extend in a matrix plane perpendicular to the optical axis. Each tilting mirror element has a first tilt position and at least a second tilt position. The tilting mirror matrix at least indirectly, i.e. optionally via optical deflection elements, deflects the first partial ray bundle in the direction of the image sensor when the tilting mirror elements are in the first tilt position. By contrast, the tilting mirror matrix at least indirectly deflects the second partial ray bundle in the direction of the image sensor when the tilting mirror elements are in the second tilt position. In the optical observation instrument according to the invention, the intermediate imaging optical system is arranged relative to the main objective, the tilting mirror matrix and the image sensor such that the respective partial ray bundle deflected in the direction of the image sensor passes the intermediate imaging optical system both on the way from the main objective to the tilting mirror matrix and also on the way from the tilting mirror matrix to the image recording system. In particular, the arrangement may be such that the partial ray bundle, on its way to the tilting mirror matrix, passes through an edge region of the intermediate imaging optical system in respect of the optical axis and, on its way to the image sensor, passes through a central region of the intermediate imaging optical system in respect of the optical axis.

The invention makes it possible to provide an optical observation instrument, more particularly a stereoscopic observation instrument, with a recording optical system common to all partial ray paths and a common image sensor, in which the light losses due to the underlying principle are minimized, in which there is no need for mechanical stops or liquid-crystal stops for switching channels and in which double optical components are not required. In particular, the optical observation instrument according to the invention can advantageously be embodied as a stereo microscope, for example as a video surgical microscope designed for surgery, in which all partial ray paths pass through a common main objective and in which use is made of a common image sensor for all partial ray paths. The disadvantages described with reference to the prior art, which emerge from the use of mechanical shutters or liquid-crystal shutters or from the use of doubly present optical components, can thus be avoided in the optical observation instrument according to the invention.

In order to suppress stray light from those partial ray bundles that are not deflected in the direction of the image sensor, it is advantageous if the optical observation instrument comprises at least one light trap, which is arranged with respect to the tilting mirror matrix such that the light of the partial ray bundle respectively not deflected in the direction of the image sensor is routed into the light trap by the tilting mirror matrix. Here it is particularly advantageous if the corresponding partial ray bundle is routed directly, i.e. in a straight line, to the light trap in order to avoid stray-light producing reflections if possible. Furthermore, it is advantageous if each optical transmission channel respectively has its own light trap, i.e. two separate light traps for the left and the right stereo channel in the case of a stereo microscope. This makes it possible in the case of both channels for the partial ray bundle respectively not deflected in the direction of the image sensor to reach the light trap without further reflection. A light trap that can, in principle, be used is described in e.g. US 2010/0182681 A1. Thus, reference is made to this document in respect of the design of a light trap suitable for the optical observation instrument according to the invention.

In an advantageous embodiment of the optical observation instrument according to the invention, the tilting mirror matrix is arranged just in front of or just behind the image plane of the intermediate imaging optical system. In other words, the intermediate imaging optical system is embodied with respect to the point of the tilting mirror matrix such that a focused intermediate image is deliberately not produced at the point of the tilting mirror matrix, but rather a deliberately slightly defocused or aberration-afflicted intermediate image. The aforementioned measure offers the advantage of minimizing disturbing brightness variations, which occur as a result of aliasing effects, in the image recorded by the image sensor. In principle, aliasing effects are created as a result of the interference between two periodic structures. In the optical observation instrument according to the invention, these are the periodic structure of the tilting mirror matrix and the periodic structure of the image sensor. As a result of the arrangement just in front of or behind the image plane, it is possible to suppress these disturbing interferences.

An additional or alternative option of suppressing interferences—and hence aberrations such as Moiré effects and aliasing—consists of arranging an optical low-pass filter between the tilting mirror matrix and the intermediate imaging optical system. By way of example, filters made of birefringent elements may be considered as low-pass filters, for example those that are known from e.g. US 2004/0042078 A1.

Moreover, the tilting mirror matrix can be arranged in a freely rotatable fashion about the optical axis. The ability to rotate makes it possible to record stereo images for a main observer and a co-observer positioned at a fixed angle to him, wherein there is one rotational position for the main observer and one for the co-observer. Moreover, in the case of a stereoscopic optical observation instrument, the ability to rotate makes it possible to set the orientation of the stereo basis, i.e. the orientation of the connecting line between the pupils of the stereo channels, as required, even if the device producing the stereoscopic partial ray bundles, e.g. a double stop, is arranged such that it can rotate synchronously with the tilting mirror matrix. Moreover, it is advantageous in the process if the optical components through which the partial ray bundles pass prior to the tilting mirror matrix are symmetric with respect to the rotational axis. In an alternative to the symmetric embodiment, those optical elements that do not have this symmetry can likewise be mounted in a rotatable fashion. However, it is advantageous to have as few rotatable components as possible in order to avoid vibrations and disturbing noise to the greatest possible extent. By way of example, the stereo basis can be set depending on the signal of a device, such as a head-tracking device or eye-tracking device, capturing the eye position of the observer, from the measurement data of which the stereo basis of the observer with respect to the object field being observed can be calculated. Methods and devices for establishing the stereo basis are known from the prior art, e.g. from DE 102 04 430 A1, and are therefore not explained in any more detail here.

In order to allow the adjustability of the orientation of the stereo basis, it is also possible, instead of the rotatable tilting mirror matrix, to use a tilting mirror matrix having controllable tilting mirror elements, which allow tilting about a tilt axis running in the plane of the tilting mirror matrix, wherein the orientation of the tilt axis can be set within the plane. Such elements typically have two tilt axes that can be controlled independently from one another and are known, for example, from J. Opt. A: Pure Appl. Opt. 8 (2006), pages 341-346 or from US 2010/0265555 A1. Using such a tilting mirror matrix offers the advantage of being able to dispense with a mechanical device for rotating the whole tilting mirror matrix. The camera sensor can, in this case, be embodied in a square fashion in particular. The images are then, in downstream image processing, cut and rotated corresponding to the position of the observer with respect to the observation field. Furthermore, such a tilting mirror matrix makes it particularly simple to realize the free orientation of the stereo basis of more than one observer, since the orientation of the individual tilting mirror elements can be set more quickly than the orientation of the whole tilting mirror matrix by rotating the tilting mirror matrix. The light from 2n pupils (for n stereo images with two pupils each) can therefore, sequentially in time, be deflected in the direction of the image sensor by the tilting mirror matrix in a particularly simple fashion. Compared to rotating mechanical shutters, this solution moreover offers the further advantage that the pupil pairs belonging to different stereo images are able to superpose on one another, without the stereo images of the observers influencing one another.

The rotatable tilting mirror matrix and, more particularly, the tilting mirror matrix with the tilting mirror elements, the orientation of the tilt axis of which can be set within the matrix plane, allow a development of the optical observation instrument in which at least three optical transmission channels are arranged with pupils at the corners of a regular polyhedron and which moreover has a control for controlling the tilting mirror matrix. The control for controlling the tilting mirror matrix controls the tilting mirror elements and/or the rotational position of the tilting mirror matrix such that the partial ray bundles of the at least three optical transmission channels are, sequentially in time, at least indirectly deflected in the direction of the image sensor. In particular, this embodiment renders it possible to build an optical observation instrument with three optical transmission channels, in which the pupils are arranged at the corners of an equilateral triangle and the partial ray bundles belonging to the transmission channels are, sequentially in time, deflected in the direction of the image sensor by means of the tilting mirror matrix. Since the three pupils are not arranged along a straight line, the distance of each object point can be determined precisely by means of triangulation using the image information obtained from the three partial ray paths. Then, it is possible initially to calculate a 3D data model of the object, from which it is then possible in turn to establish a stereo image pair for the desired stereo basis. A method that is suitable for establishing the stereo images from a 3D data model of the object is described in e.g. US 2003/0151810 A1. Therefore, reference is made to this document in respect of the method for generating the stereoscopic images on the basis of a 3D data model of the object. The optical observation instrument would assume the function of a topography recording device in the system described therein. Alternatively, it is also possible to establish an intermediate stereoscopic perspective from the three images without calculating a 3D model. A method suitable for this can be gathered from DE 10 2008 024 732 A1; reference is made thereto in respect of establishing the intermediate perspective. By way of example, the described development of the optical observation instrument would also make it possible subsequently to recalculate film sequences of the images recorded in three dimensions using software such that there is any adjustable stereo basis for the observer at the time when the images are observed, i.e. not only at the time that the images are recorded.

The switching times of the tilting mirror matrix are preferably synchronized with the at least one image sensor such that the complete switching procedure in each case falls within a time window in which there is no image integration on the image sensor.

In the optical observation instrument according to the invention, the main objective may comprise an exit pupil in which or in the vicinity of which an aperture stop is arranged that has apertures defining the pupils of the optical transmission channels. As already mentioned previously, such a stop may be arranged in a rotatable fashion, for example in order to be able to vary the orientation of the stereo basis during stereoscopic observation.

In the optical observation instrument according to the invention, the optical axis can comprise a first optical axis section and a second optical axis section, wherein the first optical axis section is defined by the optical axis of the main objective and the second optical axis section is defined by the optical axis of the image sensor. The first optical axis section and the second optical axis section include an angle. On the observer-side of the main objective there then is a deflection element between the first and the second optical axis section, which deflection element deflects a ray bundle running along the first optical axis section in the direction of the second optical axis section. The tilting mirror matrix and the intermediate imaging optical system are in this case arranged along the same optical axis section. The deflection element can be embodied as a mirror, as a deflection prism, as an optical grating, as a hologram, etc. In particular, it can be embodied as a plane optical element, for example a planar mirror. The deflection element can be arranged in or in the vicinity of the exit pupil. It is arranged in the vicinity of the exit pupil in particular if another optical component, such as a bundle-restricting aperture stop or a stop cutting out the partial ray paths, is arranged in the exit pupil itself.

If the deflection element is arranged centrally between the optical transmission channels, i.e. in the center between the two pupils in the case of stereo channels, it is possible to prevent this from adversely affecting the setting of the orientation of a stereo basis by rotating a stop and the tilting mirror matrix or the tilt axes of the tilting mirror elements.

The first optical axis section can more particularly include an angle of 90° with the second optical axis section. Here it is particularly advantageous if the second optical axis section runs within the meridional plane or the sagittal plane of a partial ray bundle running along the first optical axis section. Although angled arrangements between these two planes are also possible, these are generally less advantageous.

In a development of the optical observation instrument according to the invention, the intermediate imaging optical system is embodied such that aberrations that are created when the partial ray bundle passes through the intermediate image optical system on its way from the main objective to the tilting mirror matrix are at least partly compensated for when the partial ray bundle passes through the intermediate image optical system on its way from the tilting mirror matrix to the image sensor. In particular, the intermediate imaging optical system can in this case be embodied such that the aberrations created in the first passage of the partial ray bundle through the intermediate imaging optical system are completely compensated for during the second passage, which occurs in the opposite direction. The at least partial compensation of the aberrations is made simpler if the intermediate imaging optical system comprises at least one aspherical lens face, which is arranged in part of the ray path in which the lens sections passed by the partial ray bundle on its way from the main objective to the tilting mirror matrix have only little or, in the ideal case, no overlap with the lens sections passed by the same partial ray bundle on its way from the tilting mirror matrix to the image sensor. In this case, little overlap should be understood to mean an overlap of less than 50%, more particularly an overlap of no more than 15%.

In the optical observation instrument according to the invention, a camera adapter with a camera adapter optical system can be arranged between the intermediate imaging optical system and the image sensor. If there are still aberrations in a partial ray bundle deflected in the direction of the image sensor after the partial ray bundle has passed through the intermediate imaging optical system twice, the camera adapter optical system can be embodied such that it at least partly and, in an ideal case, entirely compensates the aberrations that still remain. In particular, the remaining image faults from the intermediate imaging optical system, which faults have a linear dependence on a radial image-field coordinate, e.g. spherical aberration, field curvature, longitudinal color aberration, etc., can be compensated for in the camera optical system by not correcting the camera optical system to an intended value of zero for these corresponding image faults, but to the negative value of the corresponding image fault that is created when passing twice through the intermediate imaging optical system.

The camera adapter optical system can be arranged entirely behind the deflection element. However, alternatively, the deflection element can also be part of the camera adapter optical system. In this case, the camera adapter optical system is embodied such that one or more lenses are situated between the deflection element and the tilting mirror matrix, whereas the remaining elements are situated between the image sensor and the deflection element. This can reduce the installation length of the camera adapter. The camera adapter optical system can more particularly be embodied as a zoom system. In this case, it is particularly advantageous if the camera adapter optical system has a stationary entry pupil plane at the point of the deflection element.

For an image sensor, the optical observation instrument can have a color sensor, which is fed the partial ray bundle that was deflected by the tilting mirror matrix. However, alternatively, there may also be at least three monochrome image sensors and a color divider for dividing the partial ray bundle into at least three color channels, i.e. into at least three spectral ranges. Here the monochrome image sensors are arranged with respect to the color divider such that one color channel of the partial ray bundle is fed to each image sensor. Such structures are known as e.g. 3CCD cameras. Compared to systems with a common image sensor for all colors, they offer a higher resolution and better image quality. By way of example, a so-called Philips prism or a beamsplitter cube (X-cube) can be used as a color divider.

In systems with three monochrome image sensors, the partial ray bundles of the individual optical transmission channels may impinge on the color divider at different angles. The angular dependence of the dichroic layers typically present in the color divider may then, in the individual optical transmission channels, lead to a shift in the wavelength ranges falling on the respective sensor faces. This may result in the color sensitivity with respect to the various partial ray bundles of the optical transmission channels differing; this is undesirable, particularly in the case of surgical microscopes because a precise color recording is of great importance to the surgeon in respect of differentiating between tissues. In order to keep the differences in the color sensitivity as low as possible, the camera adapter optical system of the optical observation instrument is therefore advantageously embodied such that, after passing through the camera adapter optical system, ray bundles emanating from different object field points have chief rays, which form an angle of no more than 20° with respect to the optical axis, preferably an angle of no more than 15°. In the ideal case they form an approximately telecentric ray path, i.e. a ray path in which the chief rays run approximately parallel. What this achieves is that the partial ray bundles from different object field points impinge on the color divider at approximately equal angles, as a result of which the shift of the wavelength ranges impinging on the respective sensor faces can be minimized for the different optical transmission channels. In other words, what is achieved is that the spectral divider ratio is approximately constant for all field points.

In the optical observation instrument according to the invention, CCD sensors and CMOS sensors in particular come into question as image sensors.

Further features, properties and advantages of the present invention emerge from the following description of exemplary embodiments, with reference being made to the attached figures.

DETAILED DESCRIPTION OF THE PREFERRED EMBODIMENTS

Figure 1:
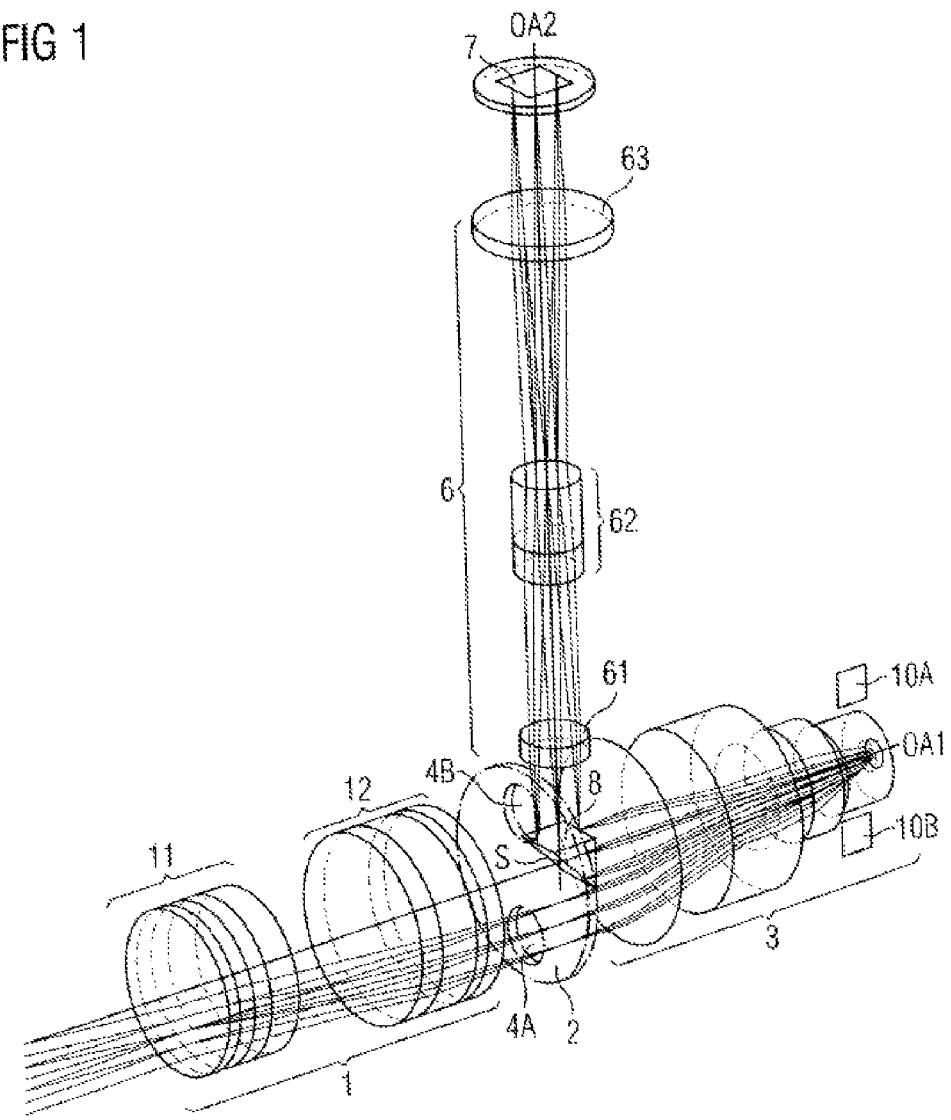
FIG. 1 shows the optical components of an optical observation instrument according to the invention which is embodied as a surgical microscope.
Figure 2:
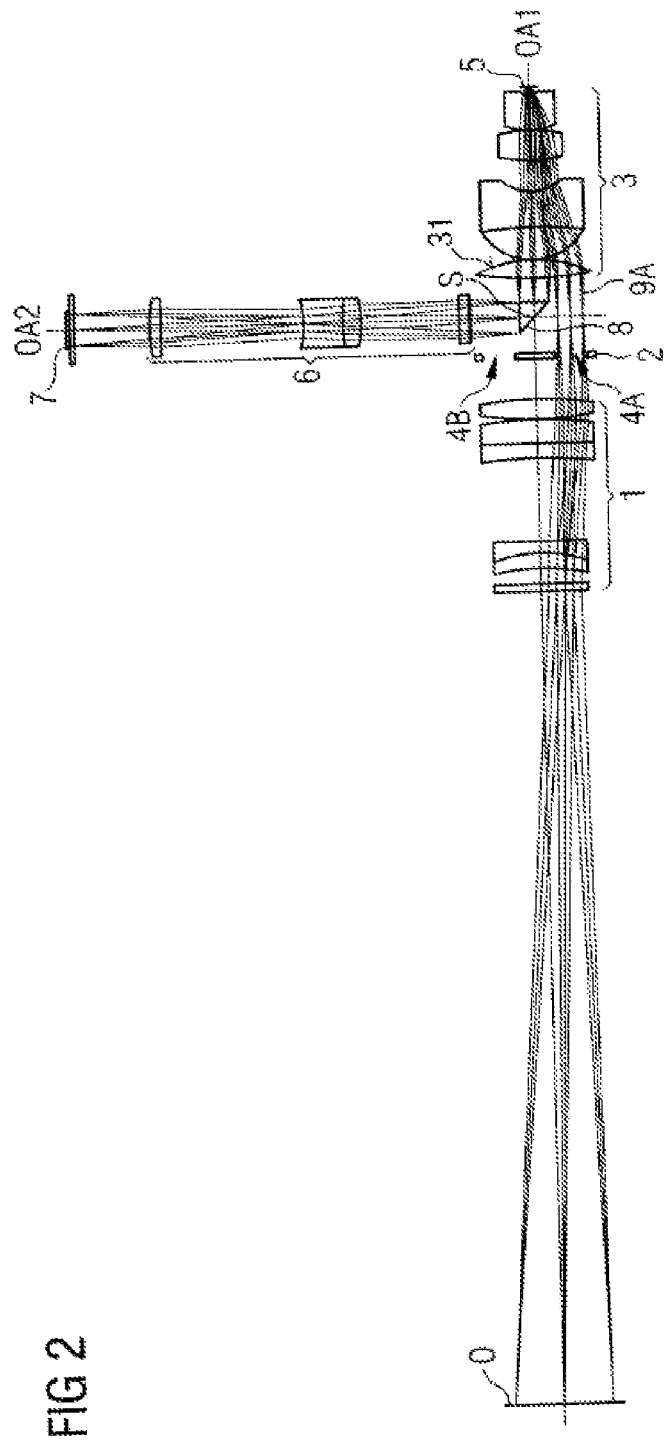
FIG. 2, in a sectional view, shows the partial ray path of the first stereo channel through the optical components from FIG. 1.
Figure 3:
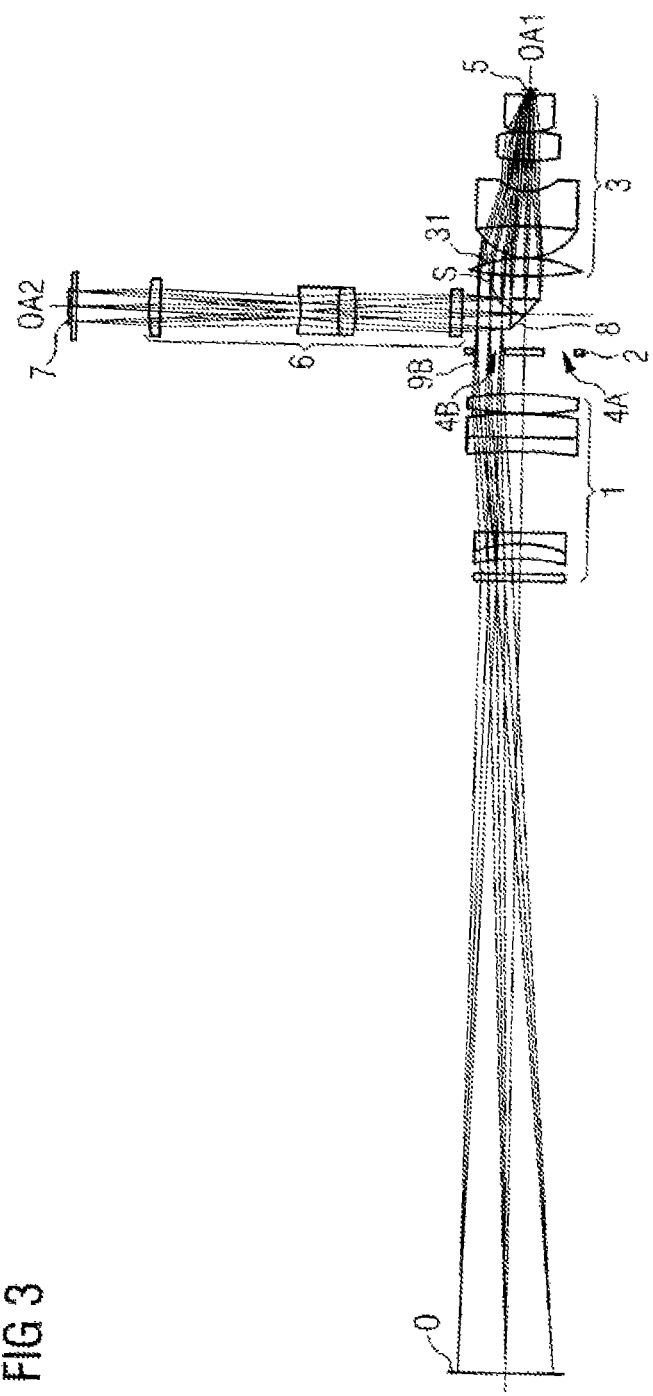
FIG. 3, in a sectional view, shows the partial ray path of the second stereo channel through the optical components from FIG. 1.

In the following text and with reference to FIGS. 1 to 4, a digital surgical microscope is described as an exemplary embodiment for an optical observation instrument according to the invention. The figures merely illustrate the optical components of the surgical microscope and (in FIGS. 2 and 3) the partial ray paths in order to avoid unnecessary complication of the figures. Here, FIG. 1 shows a perspective representation of the components. FIGS. 2 and 3 show the stereoscopic partial ray paths in a sectional view.

The surgical microscope embodied according to the invention comprises a main objective 1, an aperture stop 2, an intermediate imaging optical system 3 and a tilting mirror matrix 5, which are arranged one behind the other along a first optical axis section OA1 from the object side to the observer side. The surgical microscope furthermore comprises a camera adapter optical system 6 and an electronic image sensor 7, which are arranged one behind the other along a second optical axis section OA2 from the object side to the observer side. Together the first optical axis section OA1 and the second optical axis section OA2 form a folded optical axis of the observation instrument and intersect at an angle of 90° at an intersection point S. A deflection element 8 is arranged at the intersection point S and it deflects a ray bundle, emanating from the tilting mirror matrix and passing through the intermediate imaging optical system 3, in the direction of the second optical axis section OA2.

In the present exemplary embodiment, the main objective 1 is embodied as an objective with a variable focal length. Such objectives are also referred to as varifocal objectives or varioscopes and can, for example, comprise an object-side lens group and an observer-side lens group, wherein the observer-side lens group is arranged in a displaceable fashion along the optical axis. The varioscope of the exemplary embodiment comprises a first lens combination 11 and a second lens combination 12, which are arranged such that they can be displaced along the optical axis with respect to one another. By displacing the observer-side lens group, the working distance of the surgical microscope from the object, i.e. the distance between the focal plane of the main objective 1 and the first lens face of the main objective 1, can be varied in the present exemplary embodiment.

Although the main objective 1 in the present exemplary embodiment is embodied as a varioscope, it is also possible to equip the optical observation instrument according to the invention with a main objective that has a fixed focal length. An objective with a fixed focal length can also have two groups of lenses in this case, which are arranged at a distance from one another along the optical axis. However, instead of using a main objective with a fixed focal length having two lens groups, it is also possible to use one main objective with a fixed focal length that has fewer lenses. However, main objectives with a plurality of lenses are advantageous because these make it possible to reduce aberrations behind the main objective.

The focal length of the main objective is 336.88 mm in the present exemplary embodiment. All optical faces of the main objective have a rotationally symmetric design with respect to the first optical axis section OA1.

The main objective 1 collimates the object-side ray bundles, i.e. it substantially images them at infinity and, in the process, has a real, mechanically accessible exit pupil in a predetermined plane between the main objective 1 and the intermediate imaging optical system 3. In the present exemplary embodiment, the center point of the deflection element 8 is arranged in this exit pupil plane. The aperture stop 2 having two stop openings 4A and 4B, which cut the pupils of the two stereo channels of the surgical microscope out of the overall ray path, are directly adjacent to the deflection element 8, and hence also in the direct vicinity of the exit pupil plane. Thus, while on the object side of the stop 2 there is a ray path which, at least over the largest part of the overall cross-sectional area of the lens elements, passes through said lens elements in a centered fashion with respect to the first optical axis section OA1, there are two partial ray bundles on the image side of the aperture stop 2, which partial ray bundles each only pass through part of the cross-sectional areas of the optical elements. The aperture stop 2 can be fixedly arranged or be rotatable about the optical axis; the latter makes it possible to set the stereo basis of the stereoscopic observation as desired—this will be explained in more detail below.

The intermediate imaging optical system 3 has four lenses, wherein one lens is embodied as a cemented component. Overall, the intermediate imaging optical system is embodied as positive optical system with a focal length that is one order of magnitude smaller than the focal length of the main objective and typically lies in the range between 0.5% and 10% of the focal length of the main objective 1. In the present exemplary embodiment, the focal length of the intermediate imaging optical system is 24.57 mm. The intermediate imaging optical system generates an intermediate image in the region of the tilting mirror matrix 5 from a partial ray bundle coming from the aperture stop 2. Like the main objective 1, the intermediate imaging optical system 3 has a number of lenses in the present exemplary embodiment, with a view to correcting aberrations. Thus, there are four lenses in the present exemplary embodiment, one of which is embodied as a cemented component. Here at least one of the lens faces in the intermediate imaging optical system is advantageously embodied to be aspherical.

The tilting mirror matrix 5 is arranged in the region of the intermediate image generated by the intermediate imaging optical system 3. Here, the tilting mirror matrix 5 is advantageously arranged, or the intermediate imaging optical system 3 is embodied, such that a focused intermediate image is deliberately not produced at the point of the tilting mirror matrix 5, but rather a slightly defocused or aberration-afflicted intermediate image. This affords the possibility of minimizing interference effects that are a result of the periodic structures of the tilting mirror matrix 5 and the image sensor 7.

In the present exemplary embodiment, the tilting mirror matrix 5 is embodied as an arrangement of micromirrors that, about a common axis between two switching states, can be switched in a bi-stable fashion back and forth about a deflection angle. Such standard components are commercially available in various embodiments under the name "DMD" (digital micromirror device).

In the one tilt position of the tilting mirror elements, the tilting mirror matrix reflects the partial ray bundle 9A of the stereo channel, defined by the stop opening 4A in the aperture stop, back into the intermediate imaging optical system 3 (cf. FIG. 2), whereas the tilting mirror matrix with the tilting mirror elements in the second position reflects the partial ray bundle 9B of the stereo channel, defined by the second stop opening 4B in the aperture stop 2, back into the intermediate imaging optical system 3. By contrast, the partial ray bundle of the respective other stereo channel is not reflected back into the intermediate imaging optical system 3, but rather into a region with high absorption which can, in particular, be embodied as a light trap 10A, 10B, for example as a light trap as described in e.g. US 2010/0182681 A1. In the present exemplary embodiment, each stereo channel is provided with its own light trap. The light traps 10A, 10B are illustrated merely schematically in FIG. 1. If, as shown in FIG. 2, the partial ray bundle 9A is reflected back into the intermediate imaging optical system 3, the partial ray bundle 9B (not illustrated in FIG. 2) is routed into the light trap 10B. The partial ray bundle 9A is correspondingly routed into the light trap 10A when the partial ray bundle 9B is reflected back into the intermediate imaging optical system 3 by the tilting mirror matrix.

The deflection element 8 arranged between the aperture stop 2 and the intermediate imaging optical system 3 serves to fold the optical axis and is embodied as a mirror face in the present exemplary embodiment. However, alternatively it can also be embodied as a prism face, as an optical grating, as a hologram, etc. The mirror-face normal includes an angle of 45° with the first optical partial axis section OA1 in the present exemplary embodiment, and so the optical axis is folded by 90°. As already mentioned previously, the deflection element 8 is arranged in the exit pupil of the main objective 1.

In the present exemplary embodiment, the camera adapter optical system 6 arranged downstream of the deflection element in the direction of the image sensor 7 is embodied as an afocal zoom system. As such, in the present exemplary embodiment, it comprises three lenses or lens groups 61, 62, 63, of which the lens 63 facing the image sensor 7 is fixedly arranged and the two lenses or lens groups 61 and 62 are arranged in a displaceable fashion along the second optical axis section OA2. The zoom optical system preferably has a stationary entry pupil plane arranged at the point of the deflection element 8 or, should this prove to be impossible, in the vicinity thereof. In contrast to the illustrated exemplary embodiment, the deflection element can be integrated into the camera adapter optical system 6. By way of example, in this case it would be possible for the object-side lens 61 of the camera adapter optical system 6 to be arranged between the deflection element 8 and the intermediate imaging optical system.

In the present exemplary embodiment, the image sensor 7 is a ⅔-inch CCD sensor, directly in front of which is arranged a glass plate with plano-parallel faces. Although an individual image sensor is used in the present exemplary embodiment, there is also the option of using a so-called 3-CCD sensor. In such a sensor there is a color divider, which divides a ray bundle into three ray bundles with different spectral ranges. These three ray bundles are then routed to three different CCD sensors. In principle, it is also possible to use more than three CCD sensors, wherein use is then made of a color divider that divides the ray bundle into a corresponding number of partial ray bundles with different spectral ranges. Instead of a CCD sensor or a plurality of CCD sensors, use can also be made of a CMOS sensor or a plurality of CMOS sensors. Compared to CCD sensors, these more particularly allow higher frame rates and greater flexibility during the readout. In particular, a CMOS sensor moreover makes a greater dynamic range possible.

In a particularly advantageous embodiment of the optical observation instrument illustrated in FIG. 1, the optical properties of the main objective 1 and the intermediate imaging optical system 3 are matched to one another such that the exit pupil plane of the main objective 1 and the entry pupil of the intermediate imaging optical system 3 and the exit pupil of the intermediate imaging optical system 3 lie in the same plane. Moreover, the aperture stop 2 and the deflection element 8 are advantageously arranged in this plane or as close to this plane as possible. Furthermore, the optical properties of the camera adapter optical system 6 are advantageously embodied such that the entry pupil thereof coincides with the exit pupil of the intermediate imaging optical system 3 (with the aid of the deflection element). As a result of the aforementioned arrangement of the pupil planes and the aperture stop 2 and the deflection element 8 in a common plane or closely adjacent to said plane, it is possible to minimize the diameters of all subsystems such that this results in a particularly compact overall arrangement.

The functionality of the surgical microscope illustrated in FIG. 1 will be described below with reference to FIGS. 2 and 3. FIG. 2 shows the profile of the partial ray bundle 9A of the first stereo channel from the object plane O into the image sensor 7 in a sectional view in the plane spanned by the two optical axis sections OA1 and OA2, while FIG. 3 shows the profile of the partial ray bundle 9B of the second stereo channel from the object plane O to the image sensor 7. The sectional views illustrate the ray bundles emanating from three object points, each ray bundle respectively illustrated by a chief ray and edge rays. The two outer ray bundles represent the limit of the object field that can be imaged; the central ray bundle represents the center thereof. For reasons of clarity, the partial ray bundle that is respectively deflected into the light trap is not illustrated in either figure. Likewise, all parts of the ray bundle passing through the main objective 1 that do not pass through the stop opening of the aperture stop 2 have been omitted for reasons of clarity.

FIG. 2 shows the profile of the partial ray bundle 9A of the first stereo channel to the image sensor 7. Here, the first stereo channel is defined by the stop opening 4A of the aperture stop 2. After the partial ray bundle 9A is defined by means of the aperture-stop opening 4A, it passes through the intermediate imaging optical system 3, off-centered with respect to the first optical axis section OA1, and is imaged in a slightly defocused fashion on the tilting mirror matrix 5 by said optical system. In FIG. 2, the tilting mirror elements 51 (cf. FIG. 4) of the tilting mirror matrix 5 are in a first switching state, in which they reflect the partial ray bundle 9A back into the intermediate imaging optical system 3. Here, the reflected partial ray bundle runs largely centered, preferably completely centered, with respect to the first optical axis section OA1. The partial ray bundle of the second stereo channel, which is defined by the aperture-stop opening 4B and not illustrated in FIG. 2, is reflected into the light trap 10B (cf. FIG. 1) by the tilting mirror matrix 5 in this tilt position of the tilting mirror elements 51.

The partial ray bundle 9A of the first stereo channel reflected back into the intermediate imaging optical system 3 runs through the intermediate imaging optical system 3 largely centered, preferably completely centered, with respect to the first optical axis section OA1. By contrast, during its first passage through the intermediate imaging optical system 3, i.e. during its passage in the direction of the tilting mirror matrix 5, the path of this partial ray bundle was off-centered. Here, the off-centered nature during this passage is predetermined by the off-centered nature of the aperture-stop opening 4A. As a result of the fact that different regions of the optical faces are passed in the two passages through the intermediate imaging optical system 3, it is possible to embody the intermediate imaging optical system 3 such that aberrations produced during the first passage of the partial ray bundle 9A are wholly or at least partly mutually compensated for by aberrations produced during the second passage. To this end, the intermediate imaging optical system of the exemplary embodiment has at least one aspherical lens face 31, which is arranged in a region of the ray path in which the partial ray bundle 9A prior to the reflection at the tilting mirror matrix 5 and the partial ray bundle 9A after the reflection at the tilting mirror matrix 5 have no or only little overlap. This condition is in particular satisfied in the vicinity of the plane in which the exit pupil of the main objective and the aperture stop are situated. Accordingly, the lens facing the aperture stop 2 has the aspherical lens face 31 in the present exemplary embodiment. This condition can also be represented quantitatively in the following manner: if HH is the axis distance between the intersection point of the chief ray of an object point furthest from the image center with any plane and if HR is the axis distance between the intersection point of an edge ray, emanating from an axial object point (in the center of the image), and this plane, the position of the aspherical face in the ray path can then be characterized by virtue of the fact that the ratio of HH to HR is $\geq 2$, preferably $\geq 3$ and particularly preferably $\geq 5$.

Since all light paths have to be reversible according to the refractive law, all aberration components with an antisymmetric dependence on the image-field coordinate, e.g. comatic aberrations, distortion errors and chromatic magnification differences, would exactly compensate each other in the intermediate imaging optical system during the double passage of the ray bundle 9A. However, this auto-compensation is disturbed firstly by the symmetry breaking as a result of the deflection of the partial ray bundle 9A on the tilting mirror matrix 5 and secondly by arranging the tilting mirror matrix 5 not precisely at the position of the intermediate image. However, the use of at least one aspherical lens face nevertheless allows for a largely automatic compensation in this case, at least for monochromatic image faults.

After the reflection on the tilting mirror matrix 5 and the passage through the intermediate imaging optical system 3, the partial ray bundle 9A is deflected largely centrically, advantageously exactly centrically, with respect to the second optical axis section OA2 into the camera adapter optical system 6 by the deflection element 8. After passing through the camera adapter optical system 6, the partial ray bundle then impinges on the image sensor 7.

By contrast, if the tilting mirror elements 51 of the tilting mirror matrix 5 are in the second tilt position, the partial ray bundle 9B of the stereo channel defined by the aperture-stop opening 4B is reflected in the direction of the deflection element 8 by the tilting mirror matrix 5 after an off-centered first passage through the intermediate imaging optical system 5, wherein said ray bundle once again passes through the intermediate imaging optical system 3 largely centrically, advantageously completely centrically, with respect to the optical axis section OA1. The deflection element 8 then deflects said ray bundle largely centrically, advantageously completely centrically, with respect to the optical axis section OA2 in the direction of the image sensor 7. By contrast, the partial ray bundle 9A (not illustrated in FIG. 3) of the other stereo channel is deflected into the light trap 10A (cf. FIG. 1) by the tilting mirror elements of the tilting mirror matrix 5 in the second tilt position.

FIGS. 2 and 3 show that the fact that the tilting mirror matrix 5 reflects a partial ray bundle 9A, 9B that has passed through the intermediate imaging optical system 3 in an off-centered fashion in a largely centric fashion through the intermediate imaging optical system 3 makes it possible to route the partial ray bundles 9A, 9B of both stereo channels alternately to the same image sensor 7 through the same camera adapter optical system 6. This allows the optical observation instrument to provide a common recording optical system and a common image receiver for both stereoscopic partial ray paths. Here, it is particularly advantageous if the ray bundles reflected back into the intermediate imaging optical system 3 by the tilting mirror matrix 5 run completely centrically, since this then makes it possible to utilize, in an optimum fashion, the cross-sectional area of the optical elements arranged downstream thereof.

In contrast to the solutions known from the prior art, light losses due to the underlying principle can be minimized in the optical observation instrument according to the invention because there is no need to switch liquid-crystal stops. Compared to solutions in which use is made of mechanical shutters such as rotating shutters, the optical observation instrument according to the invention offers the advantage that the switching frequency can be changed abruptly since there is no need for large inertial masses, as e.g. a rotating shutter would constitute. Moreover, the low masses of the moving parts (tilting mirror elements) hardly lead to disturbing oscillations.

Figure 4:
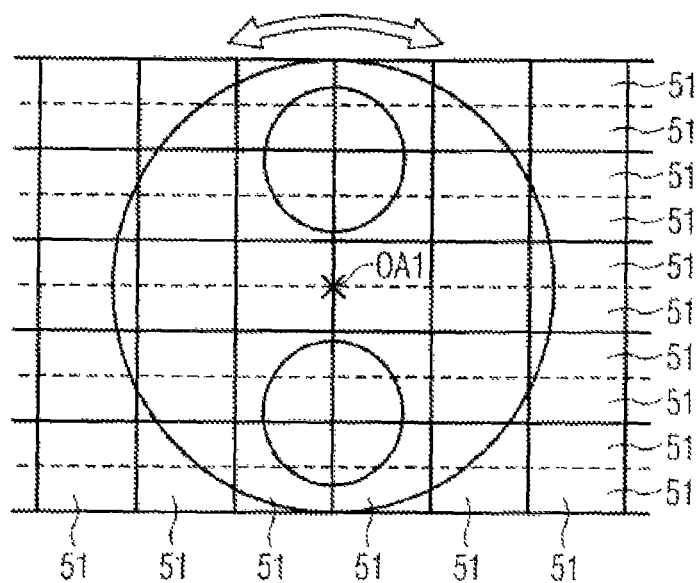
FIG. 4, in a very schematic representation along the optical axis, shows the aperture stop and the tilting mirror matrix in the surgical microscope from FIG. 1.

In a development of the surgical microscope described with reference to FIGS. 1 to 4, both the aperture stop 2 and the tilting mirror matrix 5 are not arranged in a fixed fashion but are arranged in a rotatable fashion around the first optical axis section OA1, as indicated in FIG. 4 by a double-headed arrow. As a result of synchronous rotation of the aperture stop 2 and the tilting mirror matrix 5 it is possible to rotate the position of the partial ray bundle, reflected back into the intermediate imaging optical system 3 by the tilting mirror matrix 5, about the first optical axis section OA1 during its first passage through the intermediate imaging optical system 3, as a result of which the orientation of the stereo basis of the observer can be rotated. As a result, this affords the possibility of setting the stereo basis depending on the eye position of the observer. By way of example, the eye position of the observer can in this case be established by means of a head tracker or an eye tracker, both of which supply data in respect of the stereo basis of the observer with respect to the observed object field. This data is then transmitted to a control unit of the surgical microscope, which establishes an actuation signal and transmits the latter to the aperture stop 2 and the tilting mirror matrix 5. The actuation signal contains the information relating to the angular position of the two elements with respect to a previously defined zero position. If the adjustment speed for the aperture stop 2 and the tilting mirror matrix 5 is fast enough in this case, this also allows stereo images to be recorded alternately for a main observer and a co-observer, whose stereo basis includes any angle with the stereo basis of the main observer. In principle, more than two observers can also be considered in the process, provided that the frequency at which a switch is made between the stereo bases with various orientations is high enough.

However, it is possible to dispense with the ability of the tilting mirror matrix 5 to rotate if use is made of a tilting mirror matrix in which the tilting mirror elements 51 can be independently tilted about two non-parallel axes, preferably about two axes that are perpendicular to one another. By way of example, such a tilting mirror matrix is described in US 2010/026555 A1. The use of such a tilting mirror matrix affords the possibility of arbitrarily setting the reflection direction of the tilting mirror elements on a conical face around the optical axis. This can achieve a synchronous rotation of the reflection direction about the first optical axis section OA1 with the rotational position of the aperture stop 2, without for this purpose having to rotate tilting mirror matrix as a whole.

Figure 5:
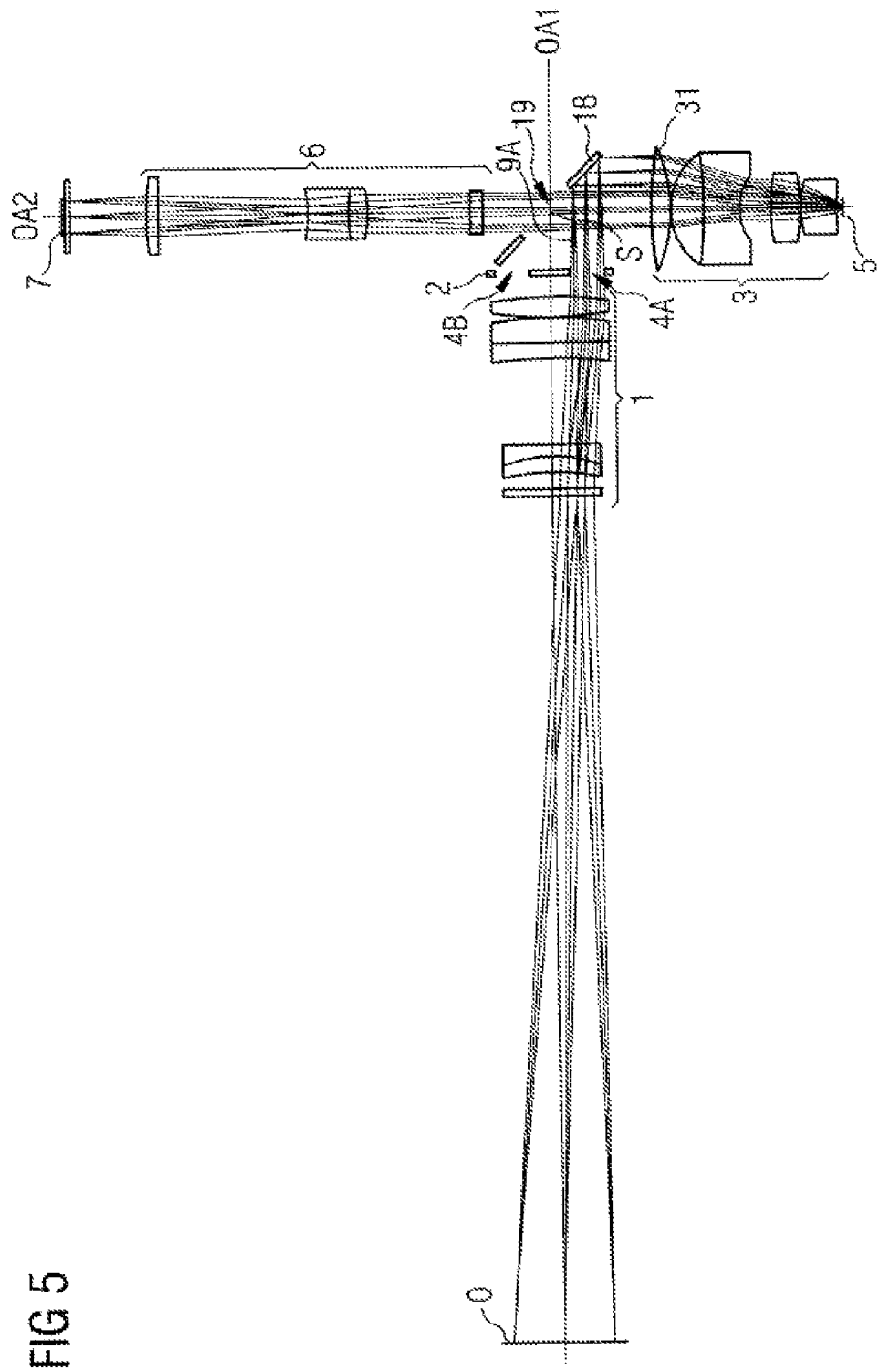
FIG. 5 shows a development of the surgical microscope from FIG. 1.

A development of the exemplary embodiment described with reference to FIGS. 1 to 4 is illustrated in FIG. 5. This figure shows the optical components of a surgical microscope, wherein the main objective 1, the aperture stop 2, the intermediate imaging optical system 3, the tilting mirror matrix 5, the camera adapter optical system 6 and the image sensor 7 have an analogous design to the corresponding components from FIGS. 1 to 4. However, what is different is the relative arrangement of the components with respect to one another. Whereas the main objective 1, the aperture stop 2, the intermediate imaging optical system 3 and the tilting mirror matrix 5 in the first exemplary embodiment are arranged linearly along the first optical axis section OA1, the intermediate imaging optical system 3 and the tilting mirror matrix 5 are not arranged along the first optical axis section OA1 in the development. Rather, the intermediate imaging optical system 3 and the tilting mirror matrix 5 are arranged linearly along the second optical axis section OA2, together with the camera adapter optical system 6 and the image sensor 7. Like in the exemplary embodiment described with reference to FIGS. 1 to 4, the optical axis sections OA1 and OA2 also intersect at right angles at the intersection point S in the embodiment variant illustrated in FIG. 5.

The modified arrangement of the intermediate imaging optical system 3 and the tilting mirror matrix 5 is also reflected in the design of the deflection element 18 in the present embodiment variant. Along the optical axis OA1, said deflection element follows the aperture stop 2 on the observer side and, with its reflecting face, said deflection element is arranged at an angle of 45° relative to the first optical axis section OA1 such that a stereoscopic partial ray bundle (in FIG. 5 only one of the two partial ray bundles is illustrated, namely the one that reaches the image sensor 7) is deflected by 90° in the direction of the intermediate imaging optical system 3. In particular, the deflection element can also be used in this embodiment variant for cutting out the pupils of the transmission channels. In this case, it has reflection regions arranged on a circular annular face, while there is no reflection in the remaining regions. The reflection faces then cut out the pupils of the transmission channels, i.e. of the stereo channels in the present exemplary embodiment. Here, the deflection element can also be arranged in a rotatable fashion about the optical axis.

Like in the first exemplary embodiment, the ray bundle in the development also passes through the intermediate imaging optical system 3 off-centered on its way to the tilting mirror matrix 5 and is reflected at least largely centrically back into the intermediate imaging optical system 3 by the tilting mirror matrix 5. The deflection element 18 has a central opening 19, which lets the deflected partial ray bundle 9A, which is centered about the second optical axis section OA2, pass in the direction of the camera adapter optical system 6. There may also be an afocal optical element instead of an opening in the center of the deflection element 18.

The statements made with reference to the first exemplary embodiment in respect of the entry and exit pupils of the optical elements and the position of the deflection element 8 and aperture stop 2 (if present) accordingly also hold true for the embodiment variant illustrated in FIG. 5.

It is advantageous, both in the embodiment variant described with reference to FIGS. 1 to 4 and in the embodiment variant described with reference to FIG. 5, if the arrangement of the two optical axis sections OA1 and OA2 is embodied such that the second optical axis section OA2 runs within the meridional plane or the sagittal plane of the partial ray bundle 9A. However, this is not mandatory and can only be implemented for specific orientations of the stereo basis even if the stereo basis can be set as desired.

Like in the exemplary embodiment described with reference to FIGS. 1 to 4, the embodiment variant in FIG. 5 also affords the possibility of generating stereoscopic images for one or more co-observers, whose stereo bases differ in terms of their orientation from the stereo basis of the main observer. Moreover, the aperture stop 2 can have additional stop openings for one or more co-observers (or the deflection element can have additional reflection regions) in both embodiment variants, wherein the orientation of the individual stereo bases of the observers is then fixedly prescribed with respect to one another. In this case, rotating the aperture stop 2 (or the deflection element) can be avoided as long as the absolute orientation of the stereo bases does not change. Then, all that is required to switch to-and-fro between the co-observers is a rotation of the tilting mirror matrix. If use is made of a tilting mirror matrix in which the individual tilting mirror elements can be independently tilted about two non-parallel axes, the tilting mirror matrix as a whole can also be installed in a fixed fashion. Appropriate controlling of the individual tilting mirror elements then brings about the switching between the individual co-observers, and so the reflection directions for the individual partial ray paths can be set sequentially in time.

A further embodiment variant of the optical observation instrument according to the invention will be described below with reference to FIG. 6. This variant can be realized in accordance with the variant illustrated in FIGS. 1 to 4 or in accordance with the variant illustrated in FIG. 5. All that differs from the two previously described variants in the third variant is the aperture stop. In the following text, this embodiment variant is described on the basis of the aperture stop. However, it also works with a deflection element that cuts out the pupils, as was described with reference to the embodiment variant shown in FIG. 5.

Figure 6:
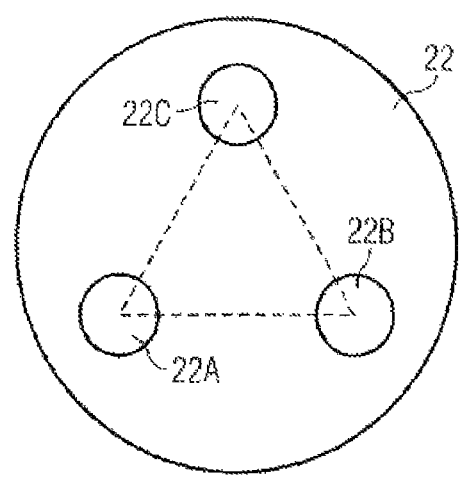
FIG. 6 shows an alternative embodiment of the aperture stop, as can be used in a development of the surgical microscope from FIG. 1 or FIG. 5.

The aperture stop 22 of the third variant is illustrated in FIG. 6. It has three stop openings 22A, 22B, 22C, the center points of which are arranged at the corners of an equilateral triangle. Thus, three optical transmission channels for three partial ray bundles are provided in the surgical microscope according to the third embodiment variant. The individual partial ray bundles are sequentially deflected by the tilting mirror matrix to the image sensor 7 through the intermediate imaging optical system 3 as a result of a suitable rotation of the tilting mirror matrix or by suitable control of the individual tilting mirror elements, if these can be independently tilted about two non-parallel axes. An exact distance determination can be undertaken for every object point by means of triangulation using the image information obtained using the three partial ray bundles. It is possible to create a 3D data model of the observation object using the determined distances and the viewing angles represented by the individual partial ray paths. Stereo images with a stereo basis with any orientation, which stereo images can be provided to the user, can subsequently be generated from this 3D data model. Given sufficient computing power, these stereo images can also be provided in real time. An advantage of this procedure is that the three-dimensional image capture is completely decoupled from the generation of the stereoscopic partial images. Thus, once the 3D data model has been created, there are in principle no limits to the number of possible co-observers. The number of possible co-observers is only restricted by the available computing power when calculating the stereo images from the 3D data model. Moreover, the described procedure allows film sequences of three-dimensionally recorded objects to be recalculated thereafter by means of software such that a respectively adapted stereo image emerges for an observer, irrespective of his stereo basis.

A further option of providing stereoscopic intermediate images on the basis of three transmission channels consists firstly of calculating a displacement vector field on the basis of the recorded partial images and then establishing the stereoscopic intermediate perspective by means of the displacement vector field. A method suitable for this is described in DE 10 2008 024 732 A1. Details of the method may be gathered from the aforementioned document, which is why reference is made to this document.

The present invention was described on the basis of exemplary embodiments, which represent surgical microscopes. However, it may also find use in other optical observation instruments in which there are different optical observation channels with mutually different partial ray bundles, in particular in any type of stereoscopic optical observation instruments. Fields of applications emerge in scientific and technical microscopes, in the case of endoscopes, in robotics, in stereo video cameras, etc. Accordingly, instead of being embodied as surgical microscope, the optical observation instrument according to the invention can be embodied as another type of stereoscopic microscope, as endoscope, as video camera, etc.

In particular, the optical observation instrument according to the invention affords the provision of any rotatable stereo basis, optionally also for a plurality of mutually independent co-observers, wherein the stereo basis can in each case be set independently. In the process, it is possible to minimize light losses, which is advantageous particularly in the case of surgical microscopes because the illumination of the operation field can be reduced and this makes it possible to reduce the exposure of the tissue in the patient.

What is claimed is:

1. An optical observation instrument with at least a first optical transmission channel for transmitting a first partial ray bundle (9A) and at least a second optical transmission channel for transmitting a second partial ray bundle (9B), wherein, arranged along an optical axis (OA1, OA2), the optical observation instrument comprises:
a main objective (1) common to the optical transmission channels,
at least one electronic image sensor (7) for recording, sequentially in time, the partial ray bundles (9A, 9B) transmitted by the optical transmission channels,
an intermediate imaging optical system (3) arranged between the main objective (1) and the image sensor (7) and is common to the optical transmission channels, and
a tilting mirror matrix (5) arranged between the main objective (1) and the image sensor (7) in or in the vicinity of an image plane of the intermediate imaging optical system (3), the tilting mirror matrix (5) having plural tiltable tilting mirror elements (51), that can be controlled in respect of their tilt position, each tilting mirror element (51) having at least a first tilt position and a second tilt position, the tilting mirror matrix (5) at least indirectly deflecting the first partial ray bundle (9A) toward the image sensor (7) when the tilting mirror elements (51) are in the first tilt position and at least indirectly deflecting the second partial ray bundle (9B) toward the image sensor (7) when the tilting mirror elements (51) are in the second tilt position,
wherein
the intermediate imaging optical system (3) is arranged relative to the main objective (1), the tilting mirror matrix (5) and the image sensor (7) so that the respective partial ray bundle (9A, 9B) deflected toward the image sensor (7) passes the intermediate imaging optical system (3) both on the way from the main objective (1) to the tilting mirror matrix (5) and on the way from the tilting mirror matrix (5) to the image sensor (7).

2. The optical observation instrument of claim 1, further comprising at least one light trap (10A, 10B), which is arranged with respect to the tilting mirror matrix (5) so that the light of the respective partial ray bundle (9A, 9B) not deflected toward the image sensor (7) is routed into the light trap (10A, 10B) by the tilting mirror matrix (5).

3. The optical observation instrument of claim 1, wherein the tilting mirror matrix (5) is arranged just in front of or behind the image plane of the intermediate imaging optical system (3).

4. The optical observation instrument of claim 1, further comprising an optical low-pass filter is arranged between the tilting mirror matrix and the intermediate imaging optical system (3).

5. The optical observation instrument of claim 1, wherein the tilting mirror matrix (5) is freely rotatable about the optical axis (OA1, OA2).

6. The optical observation instrument of claim 1, wherein the tilting mirror elements (51) are controllably tiltable about a tilt axis running in the plane of the tilting mirror matrix (5), wherein an orientation of the tilt axis can be set within the plane.

7. The optical observation instrument of claim 6, further comprising at least three optical transmission channels with pupils arranged at corners of a regular polyhedron and a control for controlling the tilting mirror matrix (5), the control controlling at least one of the tilting mirror elements (51) and the rotational position of the tilting mirror matrix (5) so that the partial ray bundles of the at least three optical transmission channels are, sequentially in time, at least indirectly deflected toward the image sensor (7).

8. The optical observation instrument of claim 6, in which the main objective (1) comprises an exit pupil in which an aperture stop (2, 22) is arranged that has apertures (4A, 4B, 22A, 22B, 22C) defining the pupils of the optical transmission channels.

9. The optical observation instrument of claim 8, wherein the aperture stop (2, 22) is rotatably arranged about the optical axis (OA1).

10. The optical observation instrument of claim 1, wherein
the optical axis comprises a first optical axis section (OA1) and a second optical axis section (OA2), the first optical axis section (OA1) being defined by the optical axis of the main objective (1) and the second optical axis section (OA2) being defined by the optical axis of the image sensor (7),
the first optical axis section (OA1) and the second optical axis section (OA2) including an angle,
a deflection element (8, 18) arranged on an observer-side of the main objective (1) and between the first and the second optical axis sections (OA1, OA2) and which deflects a ray bundle running along the first optical axis section (OA1) toward the second optical axis section (OA2), and
the tilting mirror matrix (5) and the intermediate imaging optical system (3) being are arranged along the same optical axis section (OA1, OA2).

11. The optical observation instrument of claim 10, the main objective (1) comprises an exit pupil and wherein the deflection element (8, 18) is arranged in or in the vicinity of the exit pupil.

12. The optical observation instrument of claim 10, wherein the first optical axis section (OA1) and the second optical axis section (OA2) include an angle of 90 degrees and the second optical axis section (OA2) runs within a meridional plane or a sagittal plane of a partial ray bundle running along the first optical axis section (OA1).

13. The optical observation instrument of claim 1, wherein the deflection element (8) is arranged centrally between the optical observation channels.

14. The optical observation instrument of claim 1, wherein the intermediate image optical system (3) is embodied such that aberrations created when a partial ray bundle (9A, 9B) passes through the intermediate image optical system (3) on the way from the main objective (1) to the tilting mirror matrix (5) are at least partly compensated for when the partial ray bundle (9A, 9B) passes through the intermediate image optical system (3) on the way from the tilting mirror matrix (5) to the image sensor (7).

15. The optical observation instrument of claim 14, wherein the intermediate imaging optical system (3) comprises at least one aspherical lens face (31) arranged in part of the ray path in which the lens sections passed by the partial ray bundle (9A, 9B) on its way from the main objective (1) to the tilting mirror matrix (5) have no or only little overlap with the lens sections passed on the way of said ray bundle from the tilting mirror matrix (5) to the image sensor (7).

16. The optical observation instrument of claim 10, further comprising a camera adapter with a camera adapter optical system (6) arranged between the intermediate imaging optical system (3) and the image sensor (7).

17. The optical observation instrument of claim 16, wherein the camera adapter optical system (6) compensates aberrations present after the partial ray bundle (9A, 9B) deflected in the direction of the image sensor has passed through the intermediate imaging optical system (3).

18. The optical observation instrument of claim 16, wherein the deflection element (8, 18) is part of the camera adapter optical system (6).

19. The optical observation instrument of claim 16, wherein the camera adapter optical system (6) comprises a zoom system.

20. The optical observation instrument of claim 19, wherein the camera adapter optical system (6) has a stationary entry pupil plane at the point of the deflection element (8, 18) or in the vicinity thereof.

21. The optical observation instrument of claim 20, further comprising at least three monochrome image sensors and a color divider for dividing the partial ray bundle into at least three color channels, wherein the image sensors are arranged with respect to the color divider so that one color channel of the partial ray bundle is routed to each image sensor.

22. The optical observation instrument of claim 21, wherein the camera adapter optical system (6) is embodied such that, after passing through the camera adapter optical system (6), ray bundles emanating from different object field points have chief rays, which form an angle of no more than 20° with respect to the optical axis.

23. The optical observation instrument of claim 1, wherein the partial ray bundle (9A, 9B) reaching the image sensor (7), on its way to the tilting mirror matrix (5), passes through an edge region of the intermediate imaging optical system (3) in respect of the optical axis (OA1, OA2) and, on its way from the tilting mirror matrix (5) to the image sensor (7), passes through a central region of the intermediate imaging optical system (3) in respect of the optical axis (OA1, OA2).

* * * * *